US005696890A

United States Patent [19]

Geissler et al.

[11] Patent Number: 5,696,890

[45] Date of Patent: Dec. 9, 1997

[54] METHOD OF REGISTER REGULATION AND PRINTING CONTROL ELEMENT FOR DETERMINING REGISTER DEVIATIONS IN MULTICOLOR PRINTING

[75] Inventors: Wolfgang Geissler, Bad Schönborn; Gerhard Fischer, Sinsheim; Helmut Kipphan, Schwetzingen; Rudolf-Karl Uhrig, Schriesheim, all of Germany

[73] Assignee: Heidelberger Druckmaschinen AG, Heidelberg, Germany

[21] Appl. No.: 704,361

[22] Filed: Aug. 28, 1996

Related U.S. Application Data

[63] Continuation of Ser. No. 324,403, Oct. 17, 1994, abandoned.

[30] Foreign Application Priority Data

Oct. 16, 1993 [DE] Germany .......................... 43 35 350.9

[51] Int. Cl.$^6$ .......................... G06F 15/00

[52] U.S. Cl. .......................... 395/109; 356/402

[58] Field of Search .......................... 395/106, 109, 395/111, 114, 128, 131, 132, 790; 364/526; 348/263, 650; 358/518, 526, 532; 382/162, 167, 112; 430/22, 43, 44, 358, 359, 504; 355/32, 88, 123; 356/402, 408, 411

[56] References Cited

U.S. PATENT DOCUMENTS

| | | | |
|---|---|---|---|
| 4,534,288 | 8/1985 | Brovman | 101/211 |
| 4,553,478 | 11/1985 | Greiner et al. | 101/426 |
| 4,660,159 | 4/1987 | Ott | 364/526 |
| 4,852,485 | 8/1989 | Brunner | 101/211 |
| 4,901,254 | 2/1990 | Dolezaleu et al. | 364/526 |
| 4,947,746 | 8/1990 | Jeschue et al. | 101/211 |
| 4,963,026 | 10/1990 | Kipphan | 356/401 |
| 4,975,862 | 12/1990 | Keller et al. | 364/526 |
| 5,089,977 | 2/1992 | Pflästerer et al. | 364/526 |
| 5,181,257 | 1/1993 | Steiner et al. | 382/162 |
| 5,206,707 | 4/1993 | Ott | 356/402 |
| 5,311,246 | 5/1994 | Warner et al. | 355/40 |
| 5,317,678 | 5/1994 | Duawara et al. | 395/126 |

FOREIGN PATENT DOCUMENTS

| | | |
|---|---|---|
| 0143744 | 6/1985 | European Pat. Off. . |
| 0221472 | 5/1987 | European Pat. Off. . |
| 0324718 | 7/1989 | European Pat. Off. . |
| 3719766 | 7/1990 | Germany . |
| 3903981 | 8/1990 | Germany . |
| 4012608 | 10/1991 | Germany . |

OTHER PUBLICATIONS

Tomoyuni Maruhame, Printing Method, Sep. 24, 1991 FD, Japanese Abstract.

*Primary Examiner*—Joseph Mancuso
*Assistant Examiner*—Gabriel I. Garcia
*Attorney, Agent, or Firm*—Herbert L. Lerner; Laurence A. Greenberg

[57] ABSTRACT

Printing control element for detecting color register deviations in a defined direction, the printing control element being disposed in a selected region on a printed product produced by a printing press and scannable by a single opto-electronic sensor device, includes a plurality of equidistant geometric figures disposed adjacent one another in a row without gaps therebetween in the defined direction when a print is in-register, every third one of the adjacent geometric figures being in a set color and, respectively, in the defined direction, one of the geometric figures in another color being disposed adjoining the third geometric figure; and a method of regulating color register.

4 Claims, 3 Drawing Sheets

METHOD OF REGISTER REGULATION AND PRINTING CONTROL ELEMENT FOR DETERMINING REGISTER DEVIATIONS IN MULTICOLOR PRINTING

This application is a continuation of application Ser. No. 08/324,403, filed on Oct. 17, 1994. Now abandoned.

BACKGROUND OF THE INVENTION

Field of the Invention

The invention relates to a method and a printing control element for ascertaining deviations in register in a multicolor printed product bearing a printed image, the printed image being composed of a plurality of color separations which are transferred successively to the printed product in at least two printing units of a printing press. The register deviations ascertained on the printed product may be used for adjusting register adjusting devices.

The quality of a printed product produced in a printing press is determined primarily by correct coloration and correct register. Register errors occur if the color separations which are transferred successively to the printed product in the individual printing units are not printed on top of one another with the original screen angle and the original screen spacing.

Register errors become apparent negatively in the printed image in two ways, namely, the sharpness of the printed image decreases; and, moreover, register errors cause color fluctuations in the printed image.

The human eye reacts extremely sensitively to color fluctuations. The eye notices a color change even in register errors in the order of magnitude of 10 μm. Because, in the final analysis, the human eye serves as a standard for evaluating the printed product, devices for ascertaining and correct deviations in register must have a resolution having the afore-described order of magnitude.

Incorrectly adjusted registers become noticeable in the printed image in the form of deviations in register. Register errors are determined from a set or standard color, typically "black", and then compensated for by suitable adjustment of the various plate cylinders or printing plates. Apparatuses which have become known heretofore for regulating the register enable highly accurate correction in the circumferential, lateral and diagonal directions.

To enable a quantitative detection of a register error and its purposeful elimination, register marks and measuring elements, respectively, are typically also printed in the individual partial images and, if the register is adjusted correctly, they rest on top of one another. If there is relative spacing between the register marks printed in the various ink colors, then the spacing laterally and circumferentially is compensated for by suitable register corrections. From the prior art, apparatuses for correcting register errors have become known which determine register differences both off-line, that is, outside the printing press, and in-line, that is, in the printing press during the ongoing printing process. One example for an off-line register measuring system is known from the published German Patent Document DE 37 19 766 C2. An encoded registration mark is optically surveyed on a color-matching table by a handheld measuring instrument. The register cross has a special form; it is formed of two straight lines intersecting at right angles to one another, and the intersection of the straight lines define the center of a circle. Other sets of lines extend parallel to the two straight lines. Register errors are determined from deviations of the sets of lines from a reference set of lines. Then, correction data are transmitted to the corresponding register adjusting devices.

In-line register measuring systems are more expensive to make than off-line measuring systems, but they do have the advantage that register errors which occur can very quickly be detected and eliminated. A plurality of register measuring systems have been disclosed which utilize video technology with imaging or image processing in order to detect register differences. In the published European Patent Document EP 0 221 472 A1, the register difference determination is achieved interactively and semiautomatically, in that the register crosses, which are recorded by the video camera and shown enlarged on a monitor, are activated by a human operator using a cursor control. An evaluating computer then determines the register difference from the image coordinates.

In U.S. Pat. No. 4,534,288, an in-line register measuring system is described which measures two register marks formed of two sets of lines on top of one another. The two sets of lines have a given position relative to one another. If relative displacements between the two sets of lines occur, then the degree of coincidence of the sets of lines changes. A reflection detector detects changes in the areal coincidence in the non-printed regions, and a computer ascertains the register errors accordingly. From the measured data, once again, compensating adjustments of the printing plates and the printing cylinders, respectively, are performed.

While register marks are used in the afore-described register measuring systems, U.S. Pat. No. 4,963,029 describes a method and apparatus for determining register differences which detect the occurrence of register errors in the subject of the printed product. A color video camera takes and enlarges a point in the printed image which has a given contour formed by the superimposed printing of at least two different ink colors and is detectable by a difference in brightness and/or color. Then, the printed image point taken by the video camera is broken down into the color separations of the ink colors used in printing. The determination of the deviations in register is achieved from the relative offset in the contours in the various color separations.

The invention of the instant application offers a way of determining register errors which departs from the foregoing. As previously noted in the introduction hereto, register errors automatically cause color changes in the printed image. It is accordingly an object of the invention to utilize this color displacement effect to provide a method and an apparatus for highly accurate register measurement and register regulation.

With the foregoing and other objects in view, there is provided, in accordance with one aspect of the invention, a printing control element for detecting color register deviations in a defined direction, the printing control element being disposed in a selected region on a printed product produced by a printing press and scannable by a single opto-electronic sensor device, comprising a plurality of equidistant geometric figures disposed adjacent one another in a row without gaps therebetween in the defined direction when a print is in-register, every third one of the adjacent geometric figures being in a set color and, respectively, in the defined direction, one of the geometric figures in another color being disposed adjoining the third geometric figure.

In accordance with another feature of the invention, the geometric figures are formed as rectangles, the longer sides thereof extending transversely to the defined detecting direction.

In accordance with another aspect of the invention, there is provided a printing control element for detecting color register deviations in a defined direction, the printing control element being disposed in a selected region on a printed product produced by a printing press and scannable by a single opto-electronic sensor device, comprising a plurality of equidistant geometric figures disposed adjacent one another in a row without gaps therebetween in the defined detecting direction when a print is in-register, at least a plurality of the geometric figures having a set color, and at least one geometric figure having another color disposed between every two of the geometric figures having the set color.

In accordance with a third aspect of the invention, there is provided an assembly of printing control elements for detecting color register deviations in a defined direction, the printing control elements being disposed in groups in a selected region on a printed product produced by a printing press, comprising at least a first group of fields, respectively, formed of a plurality of equidistant geometric figures disposed adjacent one another in a row without gaps therebetween in the defined detecting direction when a print is in register, at least a plurality of the geometric figures having a set color, and at least one geometric figure having another color disposed between every two of the geometric figures having the set color; at least a second group of fields, respectively, formed of a plurality of equidistant geometric figures disposed adjacent one another in a row without gaps therebetween in the defined detecting direction when a print is in-register, at least every third geometric figure of the respective second group of fields having a set color and, respectively, in the defined detecting direction, one of the geometric figures in another color being disposed adjoining the third figure of the respective second group of fields; and a third group of fields formed as respective one-color full-tone or solid fields for all colors in the print.

In accordance with an added feature of the invention, detecting directions of the respective first and second groups of fields are disposed perpendicularly to one another for detecting color register deviations in circumferential and lateral directions of the printed product.

In accordance with a fourth aspect of the invention, there is provided a method of regulating color register on a printing press for multicolor printing, which comprises producing with the printing press at least one printing control element on a printing product; obtaining measured data from the printing control element by means of an opto-electronic sensor device and feeding the data to a computation/regulating device; determining an actual color value in the computation/regulating device from the measured data and comparing the actual color value with a nominal color value therein; determining a register deviation from a value obtained by comparing the actual and nominal color values; and generating adjustment signals in the computation/regulating device for transmission to register adjusting devices for compensating for the register deviation.

In accordance with another mode, the method comprises producing at least one printing control element formed of a plurality of equidistant bars disposed adjacent one another in a row without gaps therebetween in a defined detecting direction when a print is in-register; determining the actual color value X from the printing control element by the computation/regulating device, as follows;

$$X=0.5*(1-n)*(X_1+X_2)+0.5*n*(X_1+X_3),$$

wherein n is a fraction of the overlapping pairs of bars with the convention al or standardized color values $X_1$ and $X_2$ in the defined detecting direction, and $X_3$ is the conventional or standardized color value of the printing product in non-printed state.

In accordance with a concomitant mode, the method includes determining the values $X_1$ and $X_2$ from full-tone or solid fields also printed on the printing product, and the value $X_3$ from a measurement at a non-printed location on the surface of the printed product.

Thus, with respect to the method, the object of the invention is attained in that measured data are detected in at least one selected region (measuring field) of the printed image; from the measured data of the measuring field, an actual color value is determined; the actual color value is compared with a corresponding command color value; and from a deviation between the actual color value and the command or nominal color value, the register deviation is determined.

The method of the invention can detect the required measured data from the measuring field either off-line or in-line. With respect to ascertaining the command or nominal color values, various color options are provided. In a different mode of the method of the invention, the command or nominal color values are ascertained in a printed product which represents the OK state. This type of printed product is what is known as an OK sheet.

An alternative option is to ascertain the appropriate command or nominal color values from the data of the preliminary printing stage (repro data). Because the repro data include information on the individual positions of the screen points of the individual ink colors, the extent of coincidence of the screen points of the various ink colors in the measuring field can be determined. Then, the command or nominal color value is determined from the calculated extent or degree of coincidence. In particular, in accordance with a further mode of the method of the invention, provision is made for the command or nominal locations of the screen points in the measuring field are determined from the relative angular position of the screen points in individual ink colors (screen angle) and from the spacing between screen points in the individual ink colors (screen width); the degree or extent of coincidence and moreover the actual color value of the measuring field being ascertained from the command or nominal locations of the screen points. Then, this ascertained actual color value is utilized as the command or nominal color value, for the ensuing determination of registration errors.

Another mode of the method of the invention provides that the measuring field be located inside the subject. This construction has the advantage that the margin can be omitted or reduced to a minimum.

An alternative to the foregoing provides for a plurality of specially embodied regions, which are located outside the subject, to be selected as the measuring field. Special advantageous features of these regions will be described hereinafter.

In an advantageous further feature of the method of the invention, the measured deviations in register in the various ink colors are compensated for automatically by suitable register adjustments of the corresponding printing plates or plate cylinders.

The device according to the invention which attains the objects of the invention is composed of the following components: an opto-electrical sensor device, which furnishes measured data at least from one selected region (measuring field) of the printed image; and a computation/control device which, from the measured data, determines the actual color value of the measuring field, compares the actual color value with a predetermined command or nominal color value, and from a difference between the actual color value and the command color value determines the register deviation between the individual color separations.

As already explained hereinbefore, the opto-electrical sensor device is either mounted in-line and assigned to the printing cylinder of the last printing unit, for example, or it is disposed off-line, above a color matching table for finished printed products.

The selected region (measuring field) from which the opto-electrical sensor device furnishes the measured data either is located inside the subject or includes specially formed fields, for example, in the region of the margin. In an advantageous further feature of the device of the invention, these control fields have equidistant geometric shapes which are printed with one ink color, respectively. Gaps between the equidistant geometric shapes are filled by at least one further ink color. If in-register printing is performed, the geometric shapes in the various ink colors do not overlap one another. However, the instant register displacements occur, the ink colors are printed on top of one another and thus cause color changes in the control fields.

The following embodiment of the control fields has proved to be especially advantageous: these are virtually equidistant solid color lines or bars in one ink color. Equidistant lines of a further ink color are located between them. In particular, the bar width is dimensioned so that, on the one hand, the interception region and, on the other hand, the local resolution of the measurement furnish sufficiently accurate measured values for the deviations in register. While the local resolution becomes better the narrower the width of the line, the interception region or, in other words, the maximum displacement that can be detected as a register displacement by the device according to the invention, becomes larger, the larger the chosen bar width.

Advantageously, the bar width is selected so that, on the one hand, the interception region is sufficiently large and, on the other hand, adequately high local resolution is attained, which then in the final analysis permits the desired highly accurate measurements of the deviations in register. Because the demands with respect to the interception region and the local resolution are contrary to one another, an expansion to two markers (course and fine) can be made if needed.

To permit the detection of a measurement of the deviations in register in the circumferential and lateral directions, separate control fields for each case are provided; the geometric shapes in the various ink colors are each oriented parallel to the respective measuring direction.

In the measuring field, in addition to the control fields, directional fields are provided, from the color displacements (shifts) of which, in the event of deviations in register, information as to the direction of the shift can be obtained. Also located in the measuring field are advantageously solid color fields which serve to determine standardized color values. These solid color fields must be measured at the onset of the printing process so that the correct reference values for color measurement will be available.

Because deviations in register typically are not of the same size in the entire printed image, the measurements for ascertaining the deviations in register are made advantageously at at least two diagonally opposed measuring points of the printed product. For even more reliable results, the control fields should be located as much as possible in the corner regions of the printed product.

Other features which are considered as characteristic for the invention are set forth in the appended claims.

Although the invention is illustrated and described herein as a method of register regulation and a printing control element for determining register deviations in multicolor printing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

DESCRIPTION OF THE PREFERRED EMBODIMENT

Figure 1:
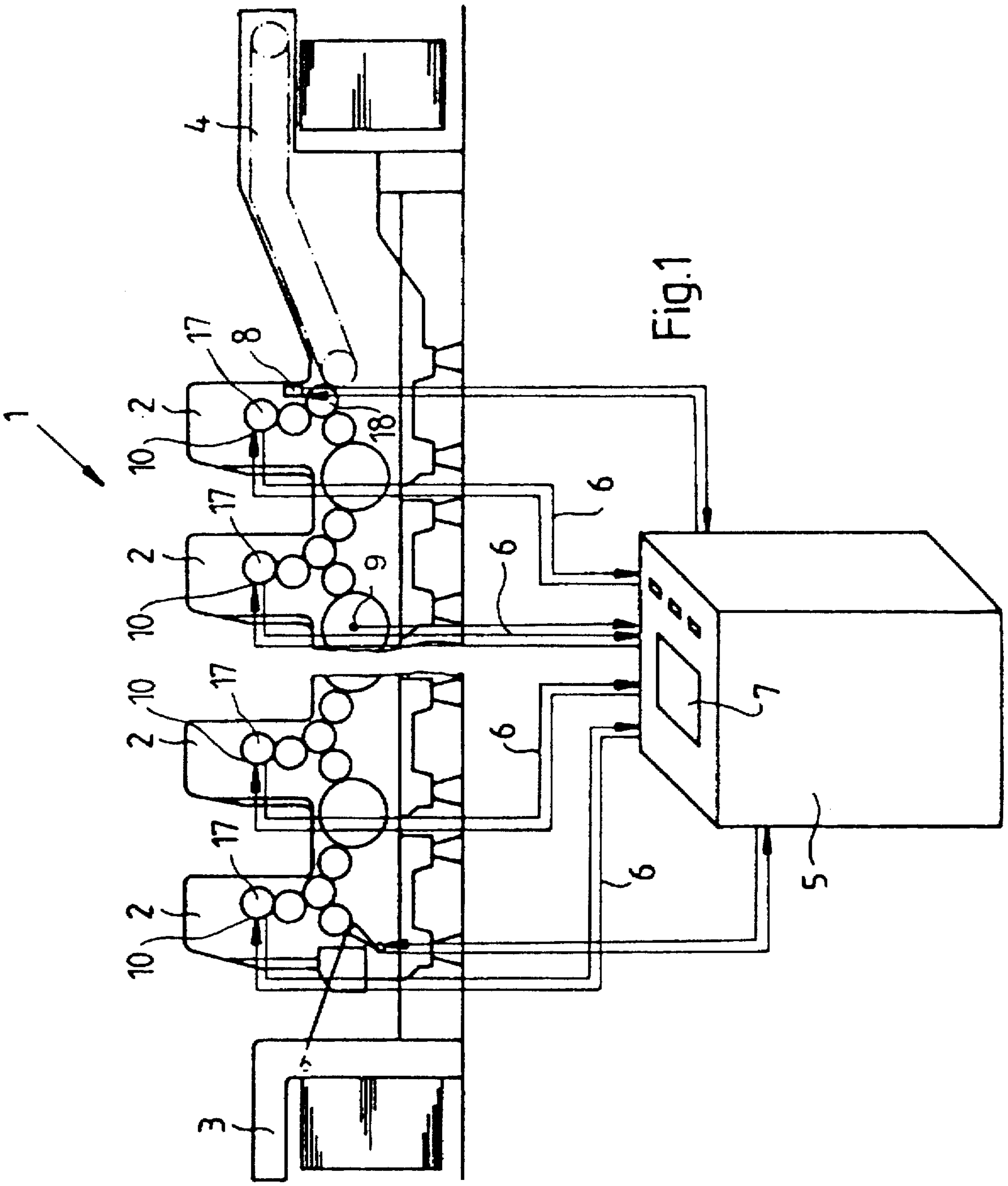
FIG. 1 is a schematic and diagrammatic side elevational view, partly in perspective, of the apparatus including printing control elements according to the invention in an in-line installation in a sheet-fed rotary printing press.

Referring now to the drawings and, first, particularly to FIG. 1 thereof, there is shown therein the apparatus according to the invention for in-line operation; that is, deviations in register which occur are measured directly in the printing press and compensated for via a regulatory or closed-loop control process. The additional expense required in this case to synchronize picture taking with the printed product traveling through the press is justified by the very rapid elimination of errors. The printing of spoiled copies or waste can be reduced to a minimum with in-line regulation of disrupting factors.

FIG. 1 shows a printing press 1 with several printing units 2, a feeder 3 and a delivery 4. During its travel through the press 1, a printed product 12 is printed in color separations in the various individual printing units 2.

An opto-electrical sensor device 8 is assigned to the printing cylinder 18 of the last printing unit 2 counting from the feeder 3. This opto-electrical sensor device 8 is triggered by a computation/control device 5 in such a way that it furnishes measured data from selected regions of the printed product 12. The computation/control device 5 is provide with an operator control panel 7. The information required for this synchronization concerning the particular angular position of the press 1 is received by the computation/control device 5 from a rotary angle transmitter 9, which is disposed on a single-revolution shaft of the press 1.

The opto-electrical sensor device 8 is formed of at least one color sensor, such as a color video camera or an online color measuring instrument. Suitable opto-electrical sensor devices are described in published European Patent Documents EP 0 143 744 A1 and EP 0 324 718 A1, for example. The measured data are transmitted to the computation/control device 5 which, from these measured data, determines the color value of the selected region. This color value is a color location in the well-known L*a*b* color space. If a registration deviation occurs, the location of the color location in this L,a,b, color space changes. As an example of a previously known method for determining color locations in the L*a*b* color space, reference is again made to the published Document EP 0 324 718 A1.

According to the invention, a color deviation is utilized to detect and then eliminate deviations in register in the printed image. The instant the computation/control device 5 has ascertained the registration deviation in the ink colors for one set color, suitable compensating register adjustments are calculated and transmitted over data lines 6 to the corresponding register adjusting devices 10 for the printing plates or plate cylinders 17.

Figure 2:
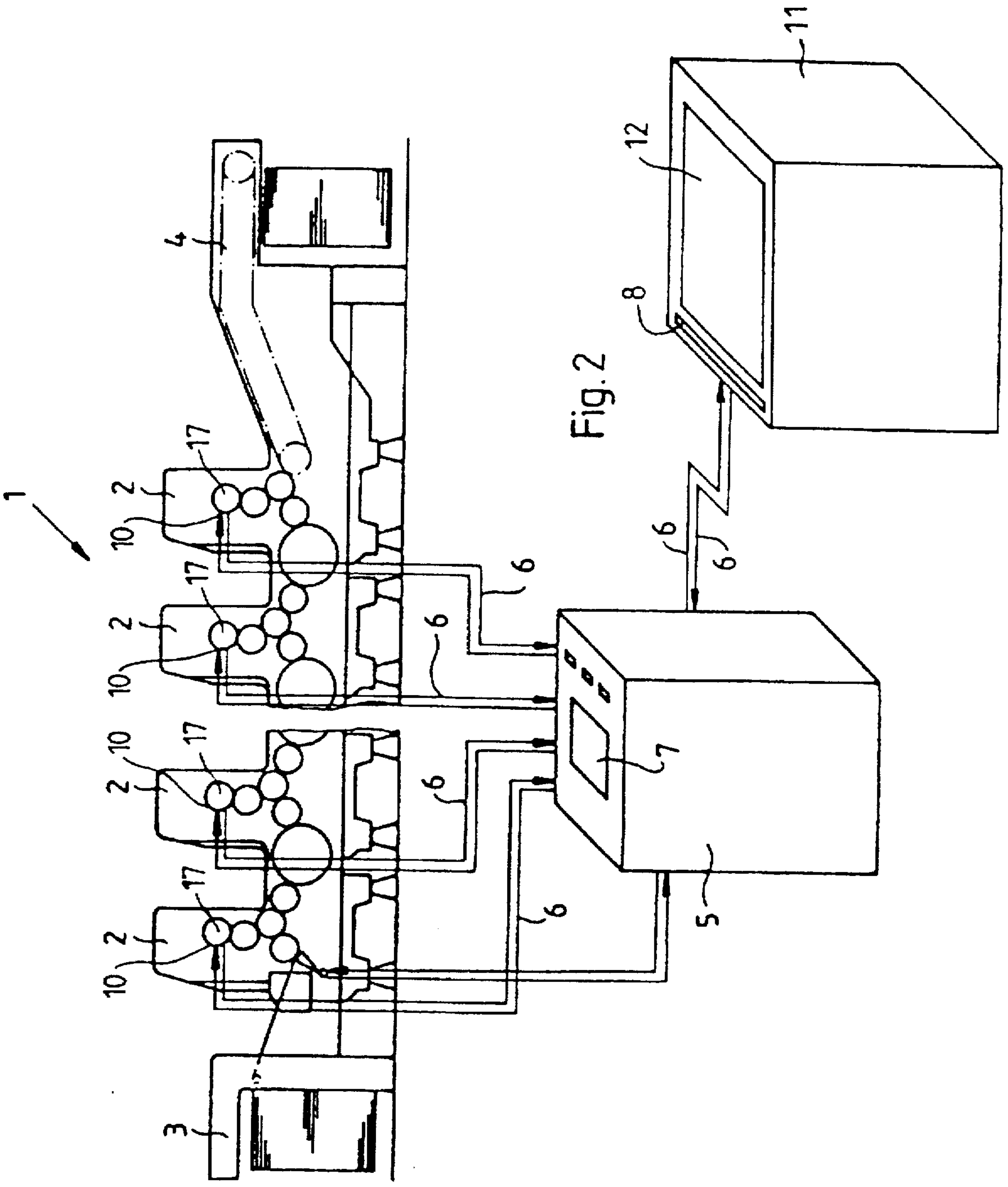
FIG. 2 is a view like that of FIG. 1 wherein the apparatus according to the invention is in an off-line installation.
Figure 3:
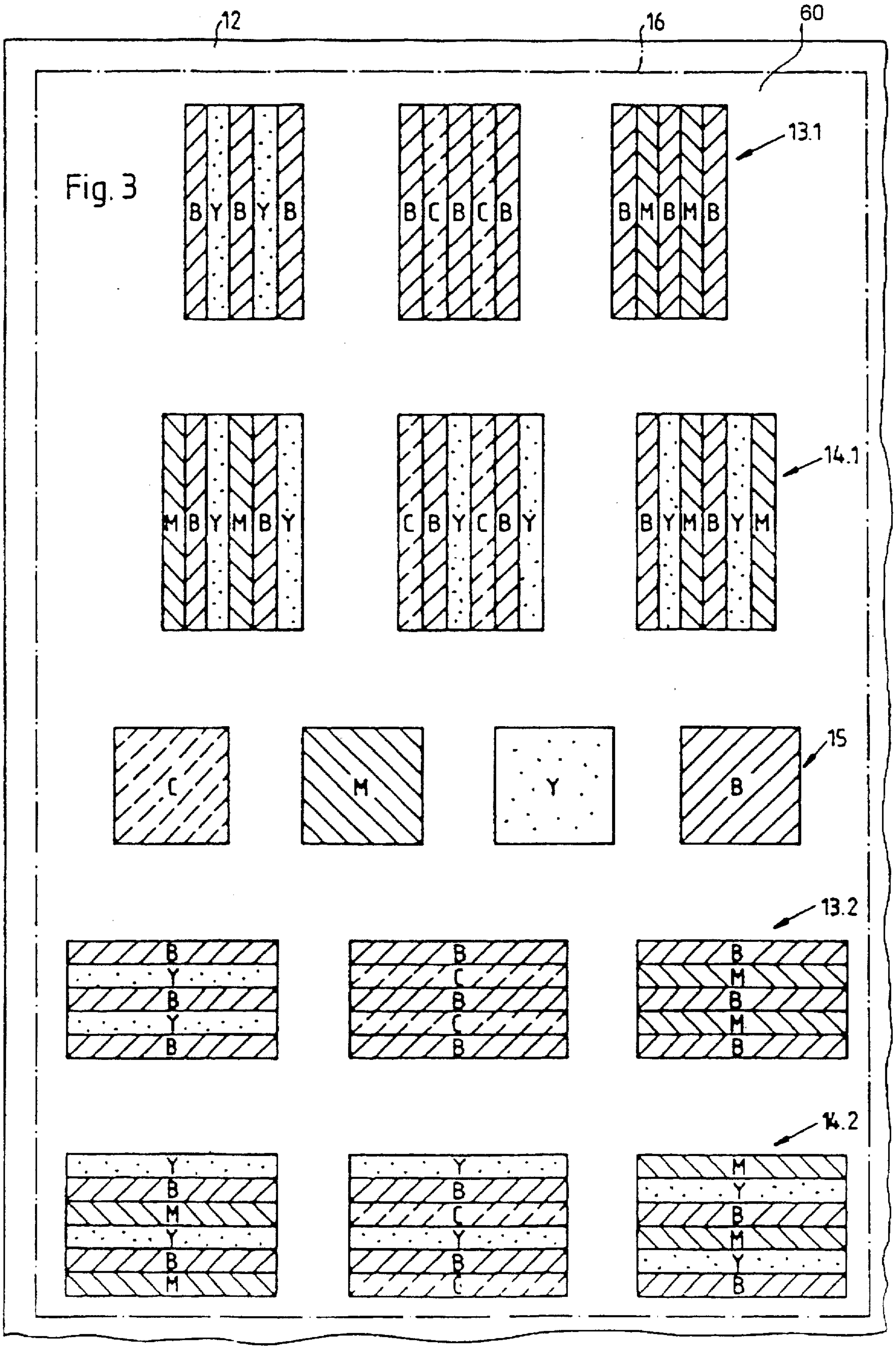
FIG. 3 is a layout of a measuring field forming part of the invention.

FIG. 2 shows the apparatus according to the invention for in off-line operation. In this regard, the measured data are ascertained at a printed product 12, which rests on a color-matching table 11. Once again, the opto-electrical sensor device 8 has at least one color sensor, such as an off-line color measuring instrument or a color video camera. The opto-electrical sensor device 8 is positioned either manually or automatically with respect to the selected regions 16 (FIG. 3). The instant the measured data indicate that color changes are occurring in the selected regions 16, the deviations in register are calculated by the computation/control device 5 with respect to a set color. According to the invention, the method utilizes the circumstance that color fluctuations occur as a consequence of registration errors. As in the case previously described hereinabove in conjunction with FIG. 1, once again the required register adjustments, which compensate for the deviations in register, are caused by the computation/control device 5.

FIG. 3 shows an advantageous embodiment of a measuring field 60 which corresponds to the aforementioned selected region 16 of the printed product 12. This measuring field 60 is especially suitable for a printing press 1 which processes the usual ink colors black, cyan, magenta and yellow.

Control fields at 13.1 and at 13.2, directional fields at 14.1 and at 14.2, and solid-color fields at 15 are disposed in the measuring field 60. In the case at hand, the ink color "black" is used as the set color, that is, deviations in register of the other ink colors are determined relative to the "black" ink color. There are three control fields, respectively, at 13.1 for the lateral register and three control fields, respectively, at 13.2 for the circumferential register. The control fields at 13.1 and 13.2 are formed of equidistant lines of the "black" color, the gaps therebetween, if the register is correct, being filled by one of the other ink colors, yellow, cyan or magenta. The width of the lines is only in the order of magnitude of 0.1 mm to 0.5 mm. For ten lines, this amounts to a control field size having a maximum of about 5 $mm^2$. Because of the small size of the measuring field 60, this field can easily be accommodated in a print-free space.

If deviations in register occur in the ink color yellow, for example, then a shift in the lines in the corresponding control field 13.1, 13.2 occurs. This shift implies a color value X, which is linked with the fraction of the overlap n between the lines of the black and yellow ink colors, in accordance with the following equation:

$$x=0.5*(1-n)*(X_B+X_Y)+0.5*n*(X_W+X_B)$$

wherein $X_B$, $X_Y$, $X_W$ are standardized color values of the black and yellow colors and of the white of the paper, respectively; and n is the fraction of the overlap.

For the color change, the registration deviation can thus be determined directly in the circumferential or lateral direction. To obtain some information regarding the direction in which the register correction must be made, the additional directional fields at 14.1 and 14.2 for the lateral and circumferential registers are provided.

With respect to the afore-described structure of the measuring field 60, it has been found that combining the individual colors with the "black" ink color produces a maximum color shift. This is especially advantageous, because, as a rule, "black" is already used as the set color.

With commercially available color video cameras, color deviations dE that are less than 0.5 can be resolved. In the case at hand, this means that register shifts of 1% of the line or bar width are detectable. For a mean line or bar width of 0.2 mm, this is equivalent to a resolution of 2 μm. The proposed method of the invention thus permits a highly accurate register measurement.

We claim:

1. A printing machine comprising an assembly of printing control elements for detecting color register deviations in a defined direction, the printing control elements being disposed in groups in a selected region on a printed product produced by a printing press, at least a first group of fields, respectively, formed of a plurality of equidistant geometric figures disposed adjacent one another in a row without gaps therebetween in the defined detecting direction when a print is in register, at least a plurality of the geometric figures having a set color, and at least one geometric figure having another color disposed between every two of the geometric figures having the set color; at least a second group of fields, respectively, formed of a plurality of equidistant geometric figures disposed adjacent one another in a row without gaps therebetween in the defined detecting direction when a print is in-register, at least every third geometric figure of the receptive second group of fields having a set color and, respectively, in the defined detecting direction, one of the geometric figures in another color being disposed adjoining the third figure of the respective second group of fields; and a third group of fields formed as respective one-color full-tone or solid fields for all colors in the print.

2. Printing control elements according to claim 1, wherein detecting directions of the respective first and second groups of fields are disposed perpendicularly to one another for detecting color register deviations in circumferential and lateral directions of the printed product.

3. Method of regulating color register on a printing press for multicolor printing, which comprises producing with the printing press at least one printing control element on a printing product; obtaining measured data from the printing control element by means of an opto-electronic sensor device and feeding the data to a computation/regulating device; determining an actual color value in the computation/regulating device from the measured data and comparing the actual color value with a nominal color value therein; determining a register deviation from a value obtained by comparing the actual and nominal color values; and generating adjustment signals in the computation/regulating device for transmission to register adjusting devices for compensating for the register deviation, wherein said at least one printing control element is formed of a plurality of equidistant bars disposed adjacent one another in a row without gaps therebetween in a defined detecting direction when a print is in-register; determining the actual color value X from the printing control element by the computation/regulating device, as follows:

$$X=0.5*(1-n)*(X1+X2)+0.5*n*(X1+X3),$$

wherein n is a fraction of the overlapping pairs of bars with the conventional or standardized color values X1 and X2 in the defined detecting direction, and X3 is the conventional or standardized color value of the printing product in non-printed state.

4. Method according to claim 3, which includes determining the values $X_1$ and $X_2$ from full-tone or solid fields also printed on the printing product, and the value $X_3$ from a measurement at non-printed location on the surface of the printed product.

* * * * *